United States Patent Office 3,700,563
Patented Oct. 24, 1972

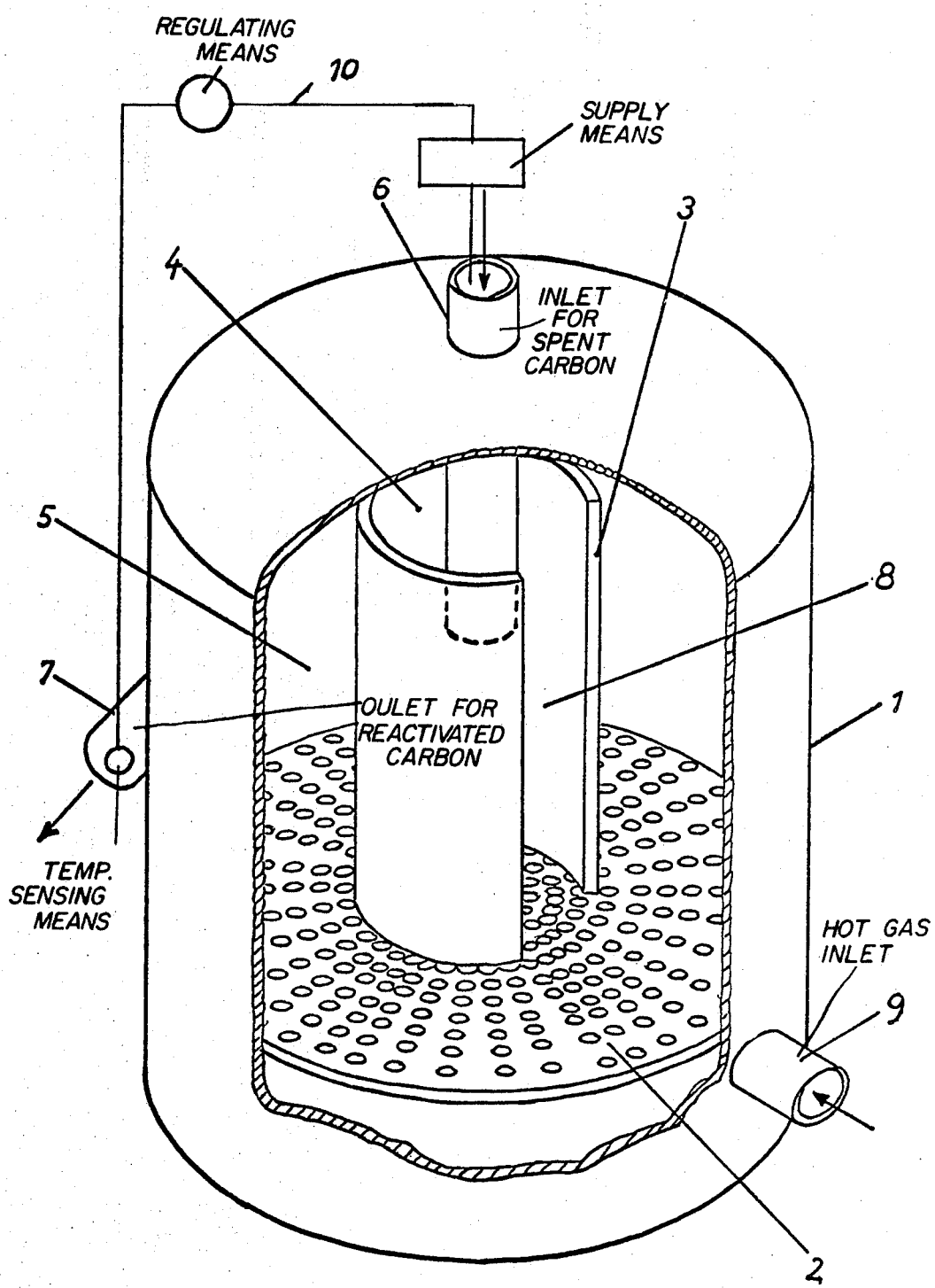

3,700,563
METHOD OF REACTIVATING SPENT ACTIVATED COAL
Joachim Karweil, Essen and Josef Degel, Bochum, Germany, assignors to Bergwerksverband G.m.b.H., Essen, Germany
Filed Aug. 19, 1969, Ser. No. 851,308
Claims priority, application Germany, Aug. 20, 1968,
P 17 92 323.7
Int. Cl. C10b 49/10
U.S. Cl. 201—1                 9 Claims

ABSTRACT OF THE DISCLOSURE

Spent activated coal is reactivated by confining a body of it in a fluidized-bed reactor and subjecting it to fluidization under continuous admission of flue gases of a predetermined temperature and containing water vapor or carbon dioxide. Treated coal is continuously removed from the fluidized bed and the temperature of the latter in the region from which the treated coal is removed is maintained at a constant temperature level below the temperature of the flue gases, the regulation of the constant temperature level being accomplished by controlling the admission of additional spent coal into the reactor as an inversely proportional of fluctuations of the temperature level.

BACKGROUND OF THE INVENTION

The present invention relates generally to the processing of activated coal, and more particularly to a method of reactivating spent activated coal.

In order to restore the adsorbing properties of activated coal (i.e. activated carbon) which has been spent, that is which has adsorbed to the limit of its capabilities, it is necessary to process the spent activated coal in order to remove the adsorbed matter from it and restore the activated coal to activated status. This can be accomplished in different ways. Thus, it is known to treat spent activated coal in rotary kiln or multi-layer furnaces with flue gases containing water vapor at temperatures ranging between 600 and 1000° C. During this treatment the adsorbed contaminants contained in the coal are vaporized and the coke residues which remain in the pores of the coal are gased, leaving the activated coal in reactivated state, that is restoring it to its original adsorption potential. The reactivated active coal obtained during this treatment which is rather slow, is of relatively uniform quality.

Attempts have also been made to carry out the reactivating process in a fludized-bed reactor. In such a reactor the matter exchange, and accordingly the reactivation of spent activated coal, occurs faster than in rotary kiln and multi-layer furnaces. This is evidently a desirable improvement, but the attempts to carry out the reactivation procedure in fludized-bed reactors has heretofore not been successful because the quality of the reactivated coal which is obtained fluctuates within unacceptable limits.

SUMMARY OF THE INVENTION

It is, accordingly, an object of the present invention to provide an improved method of reactivating spent activated coal.

More particularly it is an object of the present invention to provide a method of reactivating spent activated coal in a fluidized-bed reactor.

A concomitant object of the invention is to provide such a method which produces reactivated coal whose quality fluctuates little or not at all.

In pursuance of the above objects, and others which will become apparent hereafter, one feature of the invention resides, briefly stated, in a method of reactivating spent activated coal which comprises the steps of confining a body of such spent activated coal for treatment in a fluidized-bed reactor having an inlet and an outlet, and continuously admitting into said reactor flue gases having a predetermined temperature and containing a predetermined additive for the purpose of forming and maintaining in the reactor a fluidized bed of the coal. Treated coal is continuously withdrawn from the fluidized bed through the reactor outlet.

In accordance with the invention the temperature of the fluidized bed in the region of the outlet is maintained at a constant predetermined temperature level below the predetermined temperature of the flue gases by requlating the admission of additional spent coal through the inlet as an inversely proportional function of fluctuations in the predetermined temperature level of the fluidized bed in the region of the reactor outlet.

The invention is based on the realization that if a fluidized bed reactor is used for reactivating spent activated coal (i.e. activated carbon), and if the rate of withdrawal of treated coal as well as the rate of replenishment with spent coal is maintained constant, the temperature in the fluidized bed and in the region thereof adjacent the outlet will vary by many hundreds of degrees centigrade. It stands to reason that under these circumstances the resulting product, that is the reactivated coal which is obtained, will vary widely in its quality. Attempts to maintain a constant temperature in the entire fluidized bed are impractical, not only because they would require excessively complicated and expensive regulating arrangements, but also because they could not be entirely successful because of the fact that the coke residue remaining in the pores of the coal and which is to be removed during the reactivating process, will react more quickly than the carbon structure of the activated coal. Accordingly, the endothermic nature of the reactivating process causes initially a noticeable temperature drop in the fluidized bed. Once the coke has been removed from the pores of the coal, the temperature of the fluidized bed rises again because the carbon of the activated coal reacts considerably more slowly with the fuel gas. These phenomena can be controlled and regulated only with great difficulty, and even then only insufficiently.

Our deliberations have shown, however, that to obtain a reactivated coal of constant quality as a result of reactivating spent activated coal in a fluidized-bed reactor, it is necessary not to maintain the temperature of the entire fluidized bed constant, but only to assure that there will be a constant temperature maintained in the region of the fluidized bed from which reactivated coal is withdrawn. This is accomplished, in accordance with the present invention, by regulating this temperature and maintaining it constant in controlling the admission of additioal spent coal into the fluidized-bed reactor as an inversely proportional function of fluctuations in the temperature in question. Thus, if the temperature in the region of the fluidized bed from which the reactivated coal is being withdrawn tends to rise, then the amount of spent coal being introduced into the reactor must be increased; conversely, if the temperature tends to decrease the quantity of spent coal being admitted must be decreased.

It is further advantageous, in accordance with the present invention, to control the temperature of the flue gas and to maintain this temperature, also, as constant as possible in the region between 600 and 1200° C. This can in particular be achieved by controlling the amount of water vapor added to the flue gas. By doing this the results obtained by controlling the temperature of the aforementioned region of the fluidized bed are enhanced.

Furthermore, it is desirable that the transfer of heat energy from the flue gas into the fluidized bed be rapid, and for this reason the invention provides that the temperature of the flue gas be preferably at least 50° C., and advantageously between 100 and 200° C., higher than the temperature of the material being drawn, that is the temperature which prevails in the aforementioned region of the fluidized bed. It is evident that the specific temperature of the flue gases and of the fluidized bed in the region from which reactivated coal is withdrawn, will depend upon the type of spent coal which is being reactivated as well as the contaminants which it contains. Under these circumstances it is not possible to make specific statements concerning these temperatures but it is emphasized that the temperature ranges set forth herein will enable a person of ordinary skill in the art to determine, by simple experimentation, quite readily what the specific temperature must be in any given case.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single figure is a somewhat diagrammatic illustration, partly broken away, of a fluidized-bed reactor suitable for carrying out the invention.

DESCRIPTION OF THE PREFERRED EMBODIMENTS

Discussing now the drawing in detail it will be seen that reference numeral 1 identifies a fluidized-bed reactor per se. Such reactors are already known and the one illustrated is being shown merely for purposes of explaining the invention.

Reactor 1 comprises an apertured fluidized-bed plate 2 arranged in its interior. Also arranged in the interior of the reactor 1, above the plate 2, is an insert 3 consisting of sheet metal which is formed to the illustrated configuration, wherein the cross-section of the insert 3 resembles a three-quarter circle. The insert 3 divides the interior of the reactor 1 into an inner space 4 and an outer space 5 surrounding the inner space 4.

Reference numeral 6 identifies an inlet through which spent coal to be reactivated is introduced into the inner chamber 4, supply means being provided which supplies the spent coal. Such supply means may be of many different types and not being essential for the present invention it has not been disclosed in detail. Reference numeral 9 identifies an inlet for the hot fuel gases, such as flue gases, derived from combustion of solid, liquid or gaseous fuels and having added thereto water vapor and/or carbon dioxide. It is to be noted that, as is of course conventional, the gases are introduced below the plate 2 so as to pass upwardly through the apertures thereof.

Reference numeral 7 identifies an outlet through which treated reactivated coal is withdrawn from the interior of the reactor 1, and reference numeral 10 identifies conductor means connecting a sensing means SM provided in or on the outlet 7 with diagrammatically illustrated regulating means and further connecting the latter with the supply means.

In operation of the reactor 1, the spent coal is introduced from the supply means through the inlet 6 into the interior chamber 4 wherein it is dried and heated by the hot gases admitted through the inlet 9 and streaming up through the apertures of the plate 2. In the interior chamber 4 the spent coal is subjected to slight swirling or circulatory movement and flows through the open side 8 of the insert 3 into the outer chamber 5 which is of annular configuration and wherein it is subjected to a strong swirling action by the upwardly streaming flue gases to eventually pass into the outlet 7.

The flue gases are admitted through the inlet 9 at a constant temperature of for instance 1000° C. The reactor is filled to the level of the outlet 7 with fluidized activated coal, and additional spent activated coal is continuously introduced through the inlet 6. It is emphasized that the activated coal may have grain dimensions of substantially 1-3 mm. Furthermore, the spent coal being introduced through the inlet 6 has a water content of between substantially 80-150 parts by weight for each 100 parts by weight of dry material.

As pointed out before, the temperature of the fluidized bed in the region of the outlet 7 is to be maintained at a constant level, say 850° C. This is measured by the sensing means SM which measures the temperature of reactivated coal which is withdrawn through the outlet 7, and which in turn generates signals which are received by the regulating means. The regulating means then controls operation of the supply means as an inversely proportional function to fluctuations in the temperature detected by the sensing means SM. Thus, if the temperature of the reactivated coal issuing from outlet 7 decreases, the regulating means causes the supply means to reduce the quantity of spent coal which is introduced through the inlet 6, and conversely it causes the supply means to increase the quantity of spent coal which is being introduced through the inlet 6 when the sensing means SM detects a rising temperature in the reactivated coal issuing from the outlet 7.

Operated in this manner, the supply of spent activated coal in the reactor 1 and the output of reactivated coal through the outlet of the reactor 1 will fluctuate per hour by approximately 30%, and the product leaving the reactor 1 through the outlet 7 will be of unvarying quality and have the adsorption potential of fresh activated coal.

It is not thought necessary to discuss in detail the construction and operation of the sensing means SM, the regulating means and the supply means. Various different types of components and arrangements are suitable for these purposes and well known to those skilled in the art.

As pointed out before, the temperature of the fluidized bed in the region of the outlet 7 is to be advantageously below the temperature of the flue gases admitted through the inlet 9, by the values mentioned earlier. In order to obtain a product of the desired quality the temperature of the fluidized bed in the region of the outlet 7 may be between substantially 500 and 1000° C., the precise temperature to be selected in dependence upon the varying considerations as mentioned before, by simple experimentation.

It is also emphasized that while the invention has been described with respect to a method of reactivating spent activated coal, to which it is particularly well suited, it should be understood that generally speaking, the method is applicable to the reactivation of other solid particulate adsorption materials, in particular those of carbonaceous type which of course includes activated coal.

It will be understood that each of the elements described above, or two or more together, may also find a useful application in other types of applications differing from the types described above.

While the invention has been illustrated and described as embodied in a method of reactivating spent activated coal, it is not intended to be limited to the details shown, since various modifications and structural changes may be made without departing in any way from the spirit of the present invention.

We claim:

1. A method of temperature regulation in a fluidized-bed reactor operated for reactivating spent activated carbon, comprising the steps of confining a body of spent activated carbon for treatment in a fluidized-bed reactor having an inlet and an outlet; continuously admitting into said reactor flue gases having a predetermined temperature and containing a predetermined additive, for forming and maintaining in said reactor a fluidized bed of said carbon wherein the bed temperature in the region of said outlet varies from the temperature in other regions of the bed; continuously introducing into said fluidized bed additional spent carbon through said inlet; continuously withdrawing treated carbon from said fluidized bed by overflow through said outlet; sensing the temperature of the treated carbon which is withdrawn through said outlet; and maintaining the temperature of said fluidized bed at a constant predetermined level below said predetermined temperature only in the region of said outlet by regulating the admission of said additional spent carbon through said inlet as an inversely proportional function of fluctuations in said predetermined level which are sensed in said treated carbon withdrawn through said outlet.

2. A method as defined in claim 1, wherein said additive is water vapor.

3. A method as defined in claim 1, wherein said additive is carbon dioxide.

4. A method as defined in claim 1, wherein said additive is constituted by water vapor and carbon dioxide.

5. A method as defined in claim 1, wherein said level is lower than said predetermined temperature by at least 50° C.

6. A method as defined in claim 1, wherein said level is lower than said predetermined temperature by between substantially 100 to 200° C.

7. A method as defined in claim 1, wherein said level has a preselected value between substantially 500 and 1000° C.

8. A method as defined in claim 7, wherein said predetermined temperature is maintained constant at a given value between substantially 600 and 1200° C.

9. A method as defined in claim 8, said additive being water vapor, and wherein said predetermined temperature is maintained constant at said given value by varying the quantity of water vapor in said flue gases.

References Cited

UNITED STATES PATENTS

| | | | |
|---|---|---|---|
| 1,634,480 | 7/1927 | Wickenden et al. | 252—445 |
| 1,641,053 | 8/1927 | Sauer | 252—421 |
| 2,534,051 | 12/1950 | Nelson | 201—1 X |
| 2,677,604 | 5/1954 | Nelson | 201—1 X |
| 2,880,167 | 3/1959 | Kimberlin et al. | 252—445 X |
| 2,955,988 | 10/1960 | Sebastian | 201—31 X |

FOREIGN PATENTS

| | | | |
|---|---|---|---|
| 701,131 | 12/1953 | Great Britain | 252—421 |
| 411,918 | 6/1934 | Great Britain | 252—445 |

NORMAN YUDKOFF, Primary Examiner

D. EDWARDS, Assistant Examiner

U.S. Cl. X.R.

201—31, 36; 252—411, 417